(12) United States Patent  
Xiang et al.

(10) Patent No.: US 12,010,160 B2
(45) Date of Patent: Jun. 11, 2024

(54) NETWORK FUNCTION ENTITY AND WIRELESS COMMUNICATION METHOD THEREOF AND STORAGE MEDIUM

(71) Applicant: SAMSUNG ELECTRONICS CO., LTD., Suwon-si (KR)

(72) Inventors: Yingxin Xiang, Guangdong (CN); Dasheng Li, Guangdong (CN)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 18/059,051

(22) Filed: Nov. 28, 2022

(65) Prior Publication Data

US 2024/0048605 A1    Feb. 8, 2024

(30) Foreign Application Priority Data

Aug. 5, 2022 (CN) .......................... 202210935935.3

(51) Int. Cl.
| | | |
|---|---|---|
| H04L 65/752 | (2022.01) | |
| H04L 65/80 | (2022.01) | |
| H04W 72/542 | (2023.01) | |
| H04W 76/19 | (2018.01) | |

(52) U.S. Cl.
CPC .......... *H04L 65/752* (2022.05); *H04L 65/80* (2013.01); *H04W 72/542* (2023.01); *H04W 76/19* (2018.02)

(58) Field of Classification Search
CPC .... H04L 65/752; H04L 65/80; H04W 72/542; H04W 76/19
See application file for complete search history.

(56) References Cited

U.S. PATENT DOCUMENTS

| | | | |
|---|---|---|---|
| 2014/0254367 A1* | 9/2014 | Jeong ................ | H04W 28/0205 370/233 |
| 2015/0215957 A1* | 7/2015 | Yie ....................... | H04W 72/04 370/252 |
| 2018/0242204 A1* | 8/2018 | Zhu ........................ | H04W 76/11 |
| 2021/0212168 A1* | 7/2021 | Yoden .................... | H04W 88/06 |
| 2022/0303331 A1* | 9/2022 | Svennebring .... | H04N 21/44209 |
| 2023/0059658 A1* | 2/2023 | Kucera ................. | H04W 76/15 |

* cited by examiner

*Primary Examiner* — Schquita D Goodwin
*Assistant Examiner* — Mehulkumar J Shah
(74) *Attorney, Agent, or Firm* — NIXON & VANDERHYE P.C.

(57) ABSTRACT

Certain example embodiments relate to a network function entity and/or a wireless communication method thereof and a storage medium. Specifically, for example, a wireless communication method may be performed by a network function entity in a wireless network. The wireless communication method may include: acquiring status information related to a data transmission link during a process of video data transmission between a user equipment and a server via the wireless network; and performing an operation to adjust the video data transmission between the user equipment and the server according to the status information.

12 Claims, 11 Drawing Sheets

NETWORK FUNCTION ENTITY AND WIRELESS COMMUNICATION METHOD THEREOF AND STORAGE MEDIUM

CROSS REFERENCE TO RELATED APPLICATION

This application claims priority under 35 U.S.C. § 119 to Chinese Patent Application No. 202210935935.3, filed in the Chinese Intellectual Property Office on Aug. 5, 2022, the entire disclosure of which is hereby incorporated herein by reference.

FIELD

Certain example embodiments generally relate to the communication field, and for example, to a network function entity and/or a wireless communication method thereof and a storage medium.

BACKGROUND

With the rapid development and improvement of fourth generation (4G)/fifth generation (5G) wireless network with large bandwidth and high speed, all kinds of long video, short video and live video applications are rapidly migrated from a computer side of wired fiber network to a mobile phone side of wireless 4G/5G network, at the same time, users are expecting to have good experience for playing high definition (HD)-videos and ultra high definition (UHD)-videos, it's required to improve and optimize 4G/5G network performance to satisfy the users' expectation.

But the 4G/5G network performance is limited to maximum network capacity and management ability due to influence of many factors, e.g., when a base station is working overload in data process scheduling, or a wireless link is temporarily interrupted due to interference, data link transmission is not smooth or packets downloaded from a video server are insufficient. If the maximum limit is exceeded, the customers' video playback may be stuck, or even the current playback may be interrupted, affecting the users' experience.

SUMMARY

Certain example embodiments provide a network function entity and a wireless communication method thereof and a storage medium, for example to at least solve the problem in the related art that users' experience is affected due to video playback being stuck and/or interrupted.

In an example embodiment, a wireless communication method performed by a network function entity in a wireless network may be provided. The wireless communication method may comprise: acquiring status information related to a data transmission link during a process of video data transmission between a user equipment and a server via the wireless network; performing an operation to adjust the video data transmission between the user equipment and the server based on the status information. "Based on" as used herein covers based at least on.

In an example embodiment, the status information may include at least one of: first information about a channel quality of a transmission link between the user equipment and a base station in the wireless network; second information about an uplink transmission status of the user equipment to the base station; third information about a resource scheduling status of the base station; fourth information about data transmission between a user plane function entity in the wireless network and the server; and/or fifth information about a status of a core network control plane in the wireless network.

In an example embodiment, in a case where the status information includes the first information, the performing of the operation to adjust the video data transmission between the user equipment and the server based on the status information may include: processing video data received from the server to reduce the size of the video data to be transmitted to the base station if it is determined according to the first information that the channel quality is lower than a threshold, and transmitting the processed video data to the base station.

In an example embodiment, in a case where the status information includes the second information, the performing of the operation to adjust the video data transmission between the user equipment and the server based on the status information may include: notifying the base station to transmit a signaling to the user equipment that instructs the user equipment to reestablish an uplink if it is determined according to the second information that the uplink transmission from the user equipment to the base station is abnormal.

In an example embodiment, in a case where the status information includes the third information, the performing of the operation to adjust the video data transmission between the user equipment and the server based on the status information may include: processing video data received from the server to reduce the size of the video data to be transmitted to the base station if it is determined according to the third information that the resource scheduling of the base station is insufficient, and transmitting the processed video data to the base station.

In an example embodiment, in a case where the status information includes the fourth information, the performing of the operation to adjust the video data transmission between the user equipment and the server based on the status information may include: adding and/or reestablishing a data transmission link between the user plane function entity and the server if it is determined according to the fourth information that the amount of data downloaded by the user plane function entity from the server is less than a threshold.

In an example embodiment, in a case where the status information includes the fifth information, the performing of the operation to adjust the video data transmission between the user equipment and the server based on the status information may include: performing the operation to reduce influence of the change of the transmission link on downlink data transmission if it is determined according to the fifth information that the transmission link between the user equipment and the base station is changed.

In an example embodiment, the change of the transmission link may include that the user equipment performs handover of a cell and there may be a link speed limit to a target cell that is handed over to, wherein the performing of the operation to reduce the influence of the change of the transmission link on the downlink data transmission may include: processing video data received from the server to reduce the size of the video data to be transmitted to the base station, and transmitting the processed video data to the base station.

In an example embodiment, the network function entity may be a multi-access edge computing (MEC) net element.

In an example embodiment, a network function entity is provided. The network function entity may include: an information acquisition unit configured to acquire status information related to a data transmission link during a process of video data transmission between a user equipment and a server via the wireless network; an execution unit configured to perform an operation to adjust the video data transmission between the user equipment and the server according to the status information.

In an example embodiment, the status information may include at least one of: first information about a channel quality of a transmission link between the user equipment and a base station in the wireless network; second information about an uplink transmission status of the user equipment to the base station; third information about a resource scheduling status of the base station; fourth information about data transmission between a user plane function entity in the wireless network and the server; and/or fifth information about a status of a core network control plane in the wireless network.

In an example embodiment, in a case where the status information includes the first information, the performing of the operation to adjust the video data transmission between the user equipment and the server based on the status information including: processing video data received from the server to reduce the size of the video data to be transmitted to the base station if it is determined based on the first information that the channel quality is lower than a threshold, and transmitting the processed video data to the base station.

In an example embodiment, in a case where the status information includes the second information, the performing of the operation to adjust the video data transmission between the user equipment and the server based on the status information may include: notifying the base station to transmit a signaling to the user equipment that instructs the user equipment to reestablish an uplink if it is determined based on the second information that the uplink transmission from the user equipment to the base station is abnormal.

In an example embodiment, in a case where the status information includes the third information, the performing of the operation to adjust the video data transmission between the user equipment and the server based on the status information may include: processing video data received from the server to reduce the size of the video data to be transmitted to the base station if it is determined based on the third information that the resource scheduling of the base station is insufficient, and transmitting the processed video data to the base station.

In an example embodiment, in a case where the status information includes the fourth information, the performing of the operation to adjust the video data transmission between the user equipment and the server based on the status information may include: adding and/or reestablishing a data transmission link between the user plane function entity and the server if it is determined based on the fourth information that the amount of data downloaded by the user plane function entity from the server is less than a threshold.

In an example embodiment, in a case where the status information includes the fifth information, the performing of the operation to adjust the video data transmission between the user equipment and the server based on the status information may include: performing the operation to reduce influence of the change of the transmission link on downlink data transmission if it is determined based on the fifth information that the transmission link between the user equipment and the base station is changed.

In an example embodiment, the change of the transmission link may include that the user equipment performs handover of a cell and there is a link speed limit to a target cell that is handed over to, wherein performing of the operation to reduce the influence of the change of the transmission link on the downlink data transmission may include: processing video data received from the server to reduce the size of the video data to be transmitted to the base station, and transmitting the processed video data to the base station.

In an example embodiment, the network function entity may be a multi-access edge computing (MEC) net element.

In an example embodiment, a network function entity is provided. The network function entity may include at least one processor; and at least one memory storing computer executable instructions, wherein the computer executable instructions, when executed by the at least one processor, may cause the at least one processor to perform the above wireless communication method.

In an example embodiment, a computer readable storage medium is provided. The computer readable storage medium may store a computer program that, when executed by at least one processor, may cause the at least one processor to perform the above wireless communication method.

The example technical solutions provided by certain example embodiments may bring at least one of the following beneficial effects: based on the network function entity and the wireless communication method thereof based on an example embodiment, by acquiring the status information related to the data transmission link in the process of the data transmission between the user equipment and the server via the wireless network, and performing the operation to adjust the data transmission between the user equipment and the server based on the status information, video playback is prevented or reduced from being stuck and/or interrupted, thereby improving users' experience.

It is to be understood that both the foregoing general description and the following detailed description are exemplary and explanatory only and are not restrictive of the present disclosure.

BRIEF DESCRIPTION OF THE DRAWINGS

The accompanying drawings, which are incorporated in and constitute a part of the specification, illustrate example embodiments consistent with the present disclosure, and together with the specification serve to explain the principles of the present disclosure and do not unduly limit the disclosure.

DETAILED DESCRIPTION

In order to make those skilled in the art better understand the technical solutions of the present disclosure, the technical solutions in an example embodiment will be clearly and completely described below with reference to the accompanying drawings.

It should be noted that the terms "first", "second" and the like in the description and claims of the present disclosure and the above drawings are used to distinguish similar objects, and are not necessarily used to describe a specific order or sequence. It is to be understood that the data used in this way may be interchanged under appropriate circumstances so that the embodiments of the disclosure described herein can be practiced in orders other than those illustrated or described herein. The implementations described in the following examples are not intended to represent all implementations consistent with this disclosure. Rather, they are merely examples of apparatus and methods consistent with some aspects of the present disclosure, as recited in the appended claims.

It should be noted here that "at least one of several items" in the present disclosure means including three parallel situations of "any one of the several items", "a combination of any of the several items", "the whole of the several items". For example, "including at least one of A and B" includes the following three situations: (1) including A; (2) including B; (3) including A and B. Another example is "executing at least one of step 1 and step 2", which means the following three situations: (1) executing step 1; (2) executing step 2; (3) executing step 1 and step 2.

Figure 1:
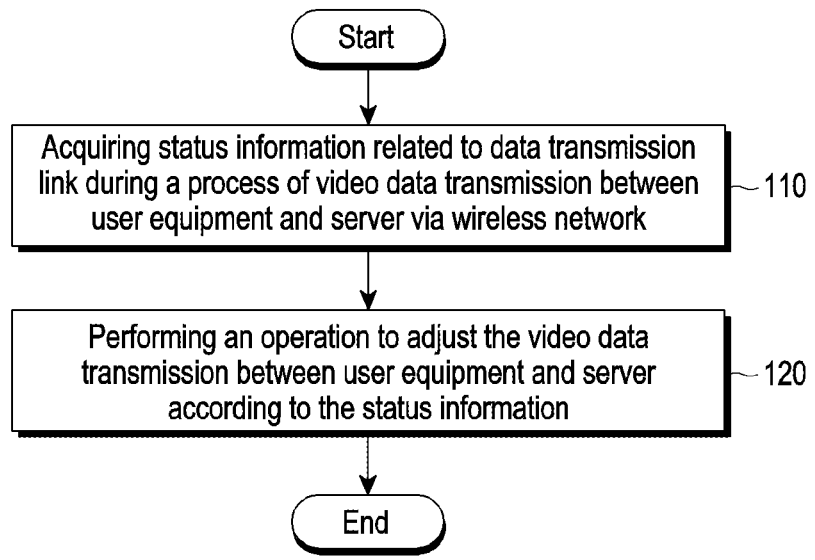
FIG. 1 is a flowchart illustrating a wireless communication method performed by a network function entity according to an example embodiment.

FIG. 1 is a flowchart illustrating a wireless communication method performed by a network function entity according to an example embodiment.

In operation 110, during a process of video data transmission between a user equipment and a server via a wireless network, status information related to the data transmission link is acquired.

Figure 2:
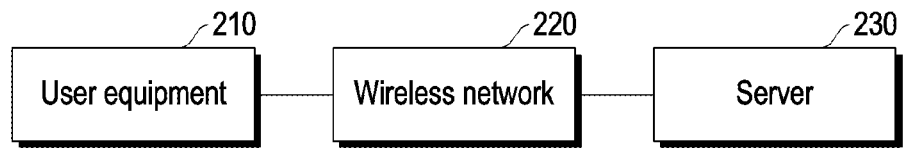
FIG. 2 is a schematic diagram illustrating an example data transmission between a user equipment and a server.

FIG. 2 is a schematic diagram illustrating the data transmission between the user equipment and the server. As shown in FIG. 2, the user equipment 210 transmits video data with the server 230 (e.g., a cloud server) via the wireless network 220 (e.g., a carrier wireless network), the wireless network 220 forwards the data packets from the server 230 to the user equipment 210, and the wireless network 220 plays the role of a pipeline of data transmission. According to the embodiment, the wireless network 220 may be a 4G network or a 5G network. In the following, description is made by taking the wireless network being a 5G network as an example.

Figure 3:
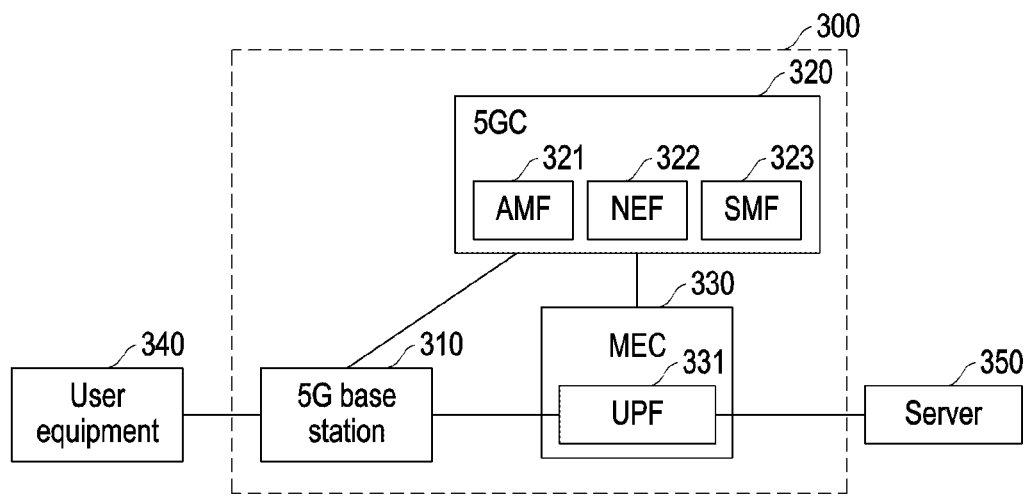
FIG. 3 is a schematic diagram further illustrating an example of a wireless network.

FIG. 3 is a schematic diagram further illustrating an exemplary composition of a wireless network. In the example of FIG. 3, the wireless network is a 5G network 300. The 5G network 300 may include a 5G base station 310, a 5G core network control plane 320 (5G core, 5GC), a multi-access edge computing (MEC) entity 330, a user plane function (UPF) entity 331 and so on. The 5G network 300 may be divided into a control plane and a user plane according to functions. The 5GC 320 is responsible for user equipment registration, link management, policy management and other services. The 5GC 320 may include an access and mobility management function (AMF) net element 321, a network exposure function (NEF) net element 322 and a session management function (SMF) net element 323. The UPF entity 331 is a user plane function, which is responsible for data transmission and forwarding services. The MEC 330 is an important net element introduced by the 5G network 300. It has functions such as computing, storage, and network. It can enhance the UPF net element and monitor the status of the control plane net element.

The thick solid line in FIG. 3 shows the data link transmission path between the user equipment 340 and the server 350. For example, video data from the server 350 may be forwarded to the 5G base station 310 via the MEC 330, and then be transmitted to the user equipment 340 by the 5G base station 310. According to an example embodiment, the network function entity performing the wireless communication method shown in FIG. 1 may be the MEC 330.

During video data transmission, the following scenarios may occur:

Scenario 1: When the user equipment is moved to a weak signal area of the wireless network (such as a cellular network), the base station has to reduce the scheduling of downlink data packets due to poor network quality. Therefore, the video data packets downloaded by the user equipment are not enough, resulting in video playback being stuck.

Scenario 2: When the user equipment is in a strong signal area of a cellular network, since instantaneous interference of the complex wireless environment (such as co-channel interference or frequency fading, etc.), the uplink of the user equipment may be temporarily interrupted (uplink desynchronization). With the current wireless communication technology, the user equipment has no way to detect the status of the uplink in time. The user equipment may try to send the uplink data for many times according to the protocol specification, and after there is no response from the other party until time out, the user equipment may declare that the transmission link has failed and reestablish a new transmission link. However, during the interruption of the uplink transmission, because the base station cannot receive the ACK feedback of the downlink data packets in time, the downlink scheduling window cannot move forward, resulting in the inability to schedule the downlink video data packets, and the download data volume is insufficient, and playback may be stuck.

Scenario 3: Because a large number of user equipments use shared resources of the base station at the same time, the base station cannot dispatch sufficient resources to users watching the videos due to insufficient shared resources, which may also lead to insufficient download of video data packets and thus the phenomenon of playback being stuck occurs.

Scenario 4: The video server in the cloud cannot process a video data request of the user equipment in time because of busyness. Therefore, the base station cannot obtain enough video data packets for downlink scheduling, which may also cause the video playback being stuck on the user equipment due to insufficient downloaded video data packets.

Scenario 5: the downlink scheduling delay may be caused by the link handover, and the change of the bearer link policy of the target cell may also limit the download data speed of the user equipment after the user equipment performs handover of the cell, resulting in video data packets downloaded by the mobile phone being insufficient and thus playback being stuck.

The reasons for the problems in each of the above scenarios are: the 3G/4G/5G wireless network deployed by the operator, from the perspective of data transmission on the data plane, is a pipeline connecting the mobile phone terminal and the video server. The transmission of video data packets in the pipeline is transparent, and the pipeline relay or forward the data package, however, the transmission link of the pipeline, especially the wireless transmission link part, is extremely complex and changeable, and is extremely susceptible to environmental changes, and the pipeline cannot respond to the impact of various changes on the transmission link in time and take actions to ensure the smoothness of the transmission link. In view of this, according to an example embodiment, in the process of video data transmission between the user equipment and the server, the network function entity acquires the status information related to the data transmission link, and performs an operation to adjust the video data transmission between the user equipment and the server according to the status information.

Figure 4:
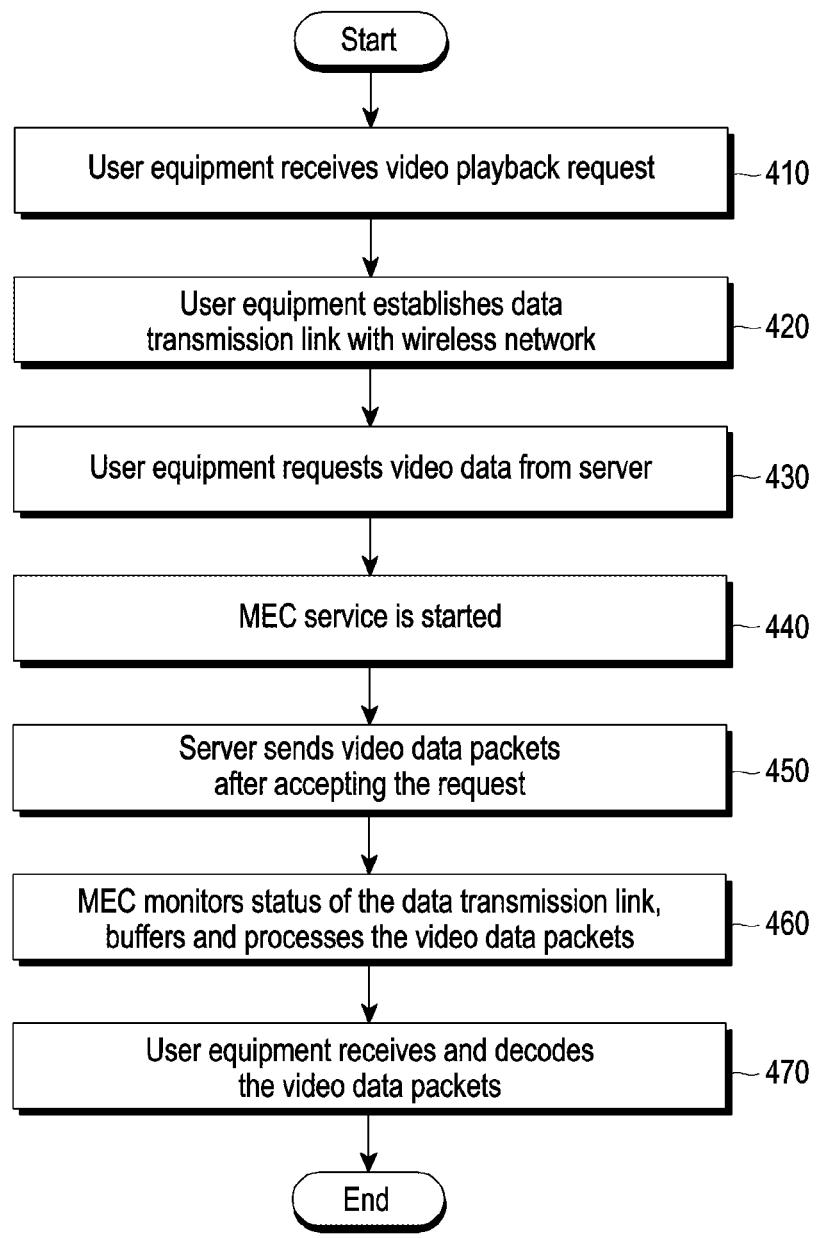
FIG. 4 is a flowchart of video data transmission between a user equipment and a server according to an example embodiment.

Since the status information related to the data transmission link is acquired in the process of video data transmission between the user equipment and the server via the wireless network in operation 110, the video data transmission between the user equipment and the server according to an example embodiment is briefly described here first with reference to FIG. 4.

As shown in FIG. 4, in operation 410, the user equipment receives a video playback request from a user. Next, in operation 420, the user equipment establishes a data transmission link with the wireless network. For example, the user equipment establishes a data transmission link with the wireless network by using a modulation and demodulation module therein. Each "module" and each "unit" herein may comprise circuitry. Subsequently, in operation 430, the user equipment requests video data from the server, for example, the user equipment sends a video uniform resource locator (URL) via the built data transmission link to request the video data from the server. For example, the data transmission link may be bound to a data unit with a data bearer identity (protocol data unit, PDU). In operation 440, the MEC service is started. In operation 450, the server sends video data packets after accepting the request. In operation 460, the MEC monitors the status of the data transmission link, buffers and processes the video data packets. Finally, in operation 470, the user equipment receives the video data packets and decodes the video data packets.

Figure 5:
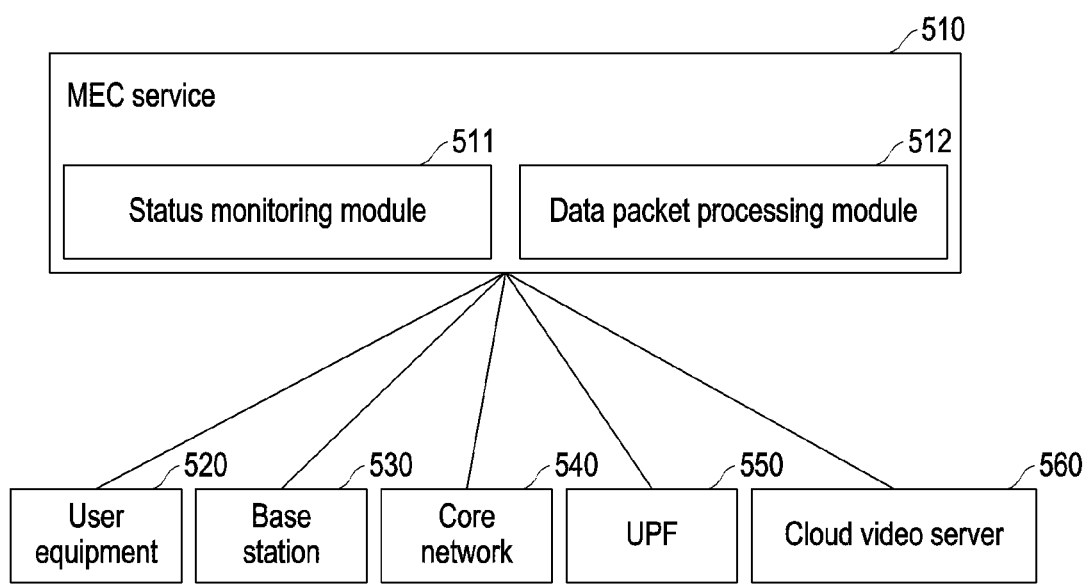
FIG. 5 is a schematic diagram illustrating the architecture of an example MEC service.

The MEC is a 5G standard network function, and the MEC has basic capabilities such as network access, data storage, and computing. The most important feature is that the MEC has a computing capability and a 5G network monitoring capability. We can use this feature to predict some unfavorable factors after obtaining the network status of the control plane and user plane, and then take measures to avoid unfavorable occurrences. According to an example embodiment, the MEC can optimize network transmission independently, intelligently and in a timely manner. A MEC service may be designed for the MEC, in certain example embodiments. The MEC service may be provided by a third party, or by a mobile network operator. The MEC service may be a software application, as shown in FIG. 5, for example, the MEC service 510 may include a status monitoring module 511 and a data packet processing module 512 comprising processing circuitry, which is designed to monitor the 5G core network 540, the base station 530, the user equipment 520, the UPF 550, and the cloud video server 560. The status monitoring module 511, comprising circuitry, may monitor the status of the data transmission link. The data packet processing module 512, comprising circuitry, may process the video data packets according to the monitored status to adjust the video data transmission.

Figure 6:
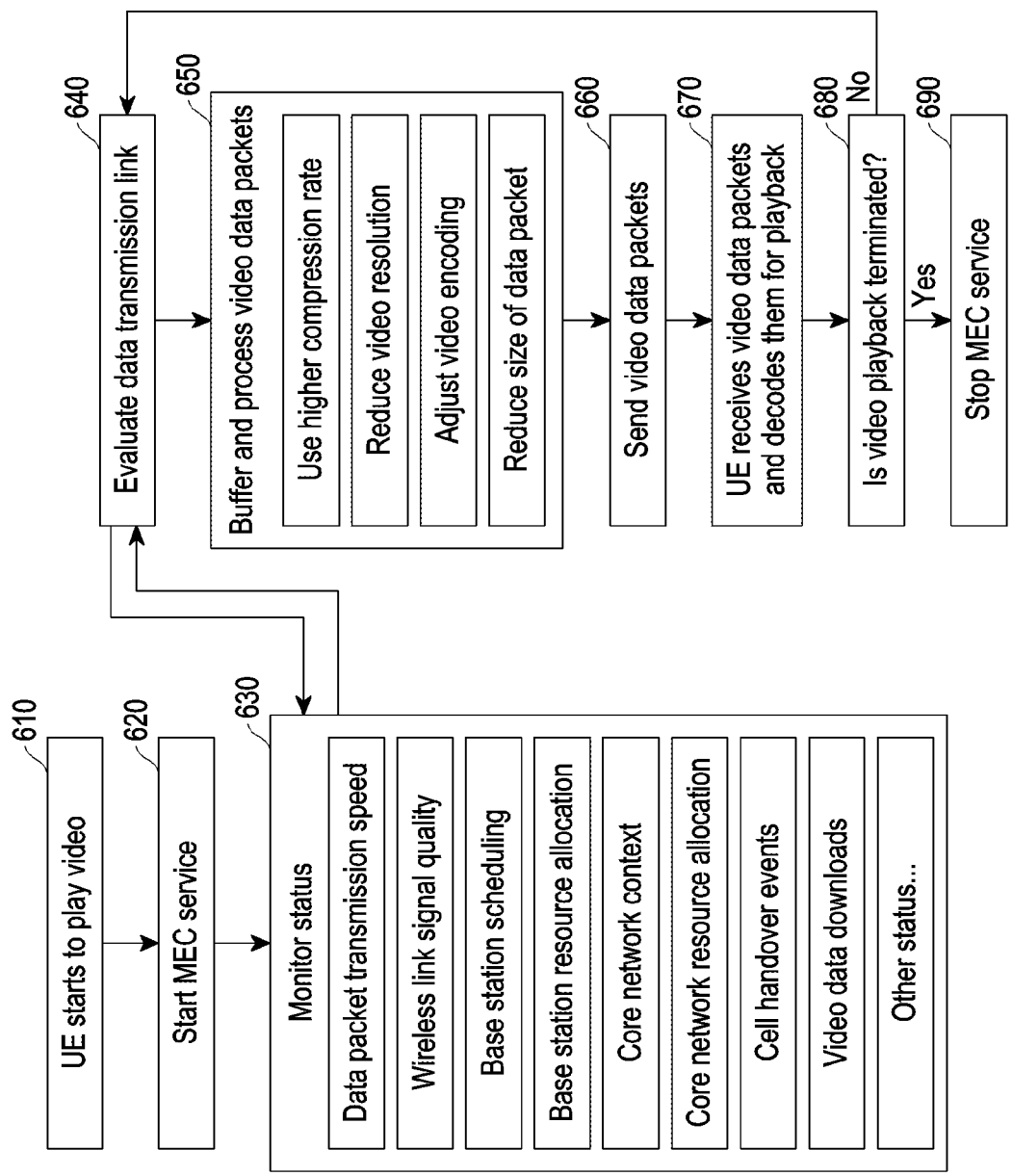
FIG. 6 shows a schematic workflow of an example MEC service.

FIG. 6 shows a schematic workflow of the MEC service. As shown in FIG. 6, in operation 610, the UE starts to play the video, and in operation 620, the MEC service may be started. In operation 630, the MEC may monitor the status of the data transmission link, including monitoring a wireless link signal quality, a data packet transmission speed, base station scheduling, base station resource allocation, core network context, cell handover events, core network resource allocation, and video data downloads and so on. In operation 640, the MEC may evaluate the data transmission link according to the monitored status information, and buffer and process the video data packets according to the evaluation result in operation 650. For example, packets are processed to reduce the size of video data to be sent to the base station, the processing performed may include reducing a video resolution, adjusting a frame rate, adjusting video encoding, reducing size of the data packet, using a higher compression rate, etc. After processing the video data packets, in operation 660, the MEC may send the video data packets to the UE, and in operation 670, the UE receives the video data packets and decodes them for playback. If the playback of the video data is terminated, in operation 690, the MEC service may be stopped; otherwise, the MEC service nay always be enabled, and in operation 640, the MEC may continue to monitor to obtain the status information related to the data transmission link. As an example, the status information comprises at least one of first information about a channel quality of a transmission link between the user equipment and a base station in the wireless network; second information about an uplink transmission status of the user equipment to the base station; third information about a resource scheduling status of the base station; fourth information about data transmission between a user plane function entity in the wireless network and the server; fifth information about a status of a core network control plane in the wireless network. However, the status information is not limited to the above examples, but may be any status information related to the data transmission link.

Referring back to FIG. 1, after the status information is acquired, in operation 120, an operation is performed according to the status information to adjust the video data transmission between the user equipment and the server. According to an embodiment, the status information may include the above first information. In the case that the status information includes the first information, the operation 120 may include: if it is determined according to the first information that the channel quality is lower than a threshold, processing video data received from the server to reduce the size of the video data to be transmitted to the base station, and transmitting the processed video data to the base station.

As mentioned above, in the process of video data transmission, scenario 1 may occur, that is, when a user moves to a weak signal area of a wireless network (such as a cellular network), the base station has to reduce the scheduling of downlink data packets due to poor network quality. Therefore, the video data packets downloaded by the user equipment are not enough, resulting in video playback being stuck.

Figure 7:
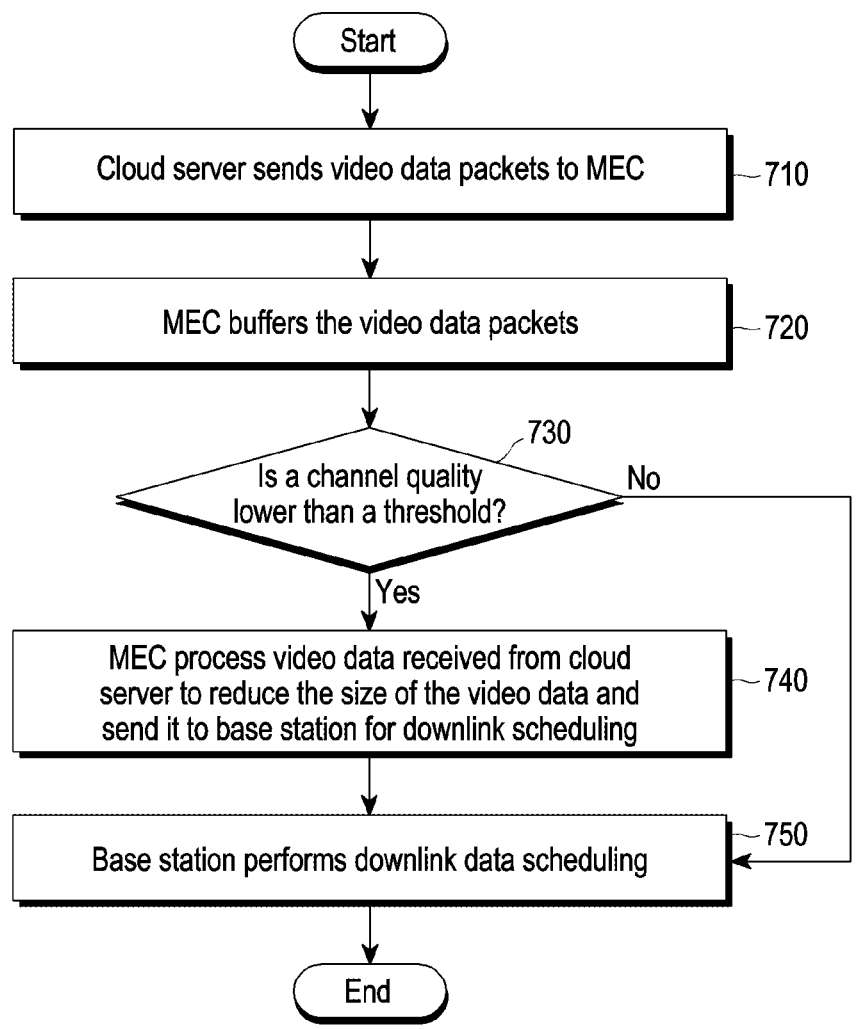
FIG. 7 is a flowchart illustrating a wireless communication process under a first scenario according to an example embodiment.

For this scenario, according to an example embodiment, the MEC may acquire the first information during data transmission, and if it is determined according to the first information that the channel quality is lower than the threshold, the MEC may process the video data received from the server to reduce the size of the video data to be sent to the base station, and send the processed video data to the base station, thereby effectively reducing the phenomenon of the video playback being stuck that occurs in scenario 1. FIG. 7 is a flowchart illustrating a wireless communication process under a first scenario (scenario 1) according to an example embodiment.

Referring to FIG. 7, in operation 710, the cloud server sends video data packets to the MEC. In operation 720, the MEC buffers the video data packets. During the video data packet transmission process, the MEC may monitor the base station in real time to obtain the first information about the channel quality of the transmission link between the user equipment and the base station in the wireless network. The first information may include uplink channel quality information and/or downlink channel quality information. For example, the base station obtains the downlink channel quality information by receiving channel state indication (CSI) information reported by the terminal, and the base station obtains the uplink channel quality information by detecting the uplink sounding reference signal (SRS), and in the case of a time division system, the downlink channel quality information may also be obtained through channel reciprocity. In operation 730, the MEC may determine whether the channel quality is lower than a threshold according to the acquired first information. If the channel quality is lower than the threshold, the amount of downlink scheduling data may decrease, and the stream cannot reach the rate of smooth playback. Therefore, if it is determined in operation 730 that the channel quality is lower than the threshold, then in operation 740, the MEC may process the video data received from the cloud server to reduce the size of the video data of the same playing time, and then send it to the base station for downlink scheduling. The processing performed may include, but is not limited to, lowering the resolution, lowering the frame rate, re-encoding the video, etc., as long as the size of the video data to be sent to the base station may be reduced. Then, in operation 750, the base station performs downlink data scheduling, for example, the base station sends the received processed video data to the user equipment. Through the manner shown in FIG. 7, the problem in the first scenario mentioned above may be effectively solved.

Referring back to FIG. 1, after the status information is acquired, in operation 120, an operation is performed according to the status information to adjust the video data transmission between the user equipment and the server. According to an embodiment, the status information may include the second information. In the case that the status information includes the second information, the operation 120 may include: if it is determined according to the second information that the uplink transmission from the user equipment to the base station is abnormal, notifying the base station to transmit a signaling to the user equipment that instructs the user equipment to reestablish an uplink.

As mentioned above, in the process of video data transmission, scenario 2 may occur, that is, when the user equipment is in a strong signal area of a cellular network, since instantaneous interference of the complex wireless environment (such as co-channel interference or frequency fading, etc.), the uplink of the user equipment may be temporarily interrupted (uplink desynchronization), thereby resulting that the base station cannot schedule the downlink video data packets, and the download data volume is insufficient, and playback may be stuck.

For this scenario, according to an example embodiment, the second information may be acquired during the data transmission process, and if it is determined according to the second information that the uplink transmission is abnormal, the MEC may notify the base station to send an instruction to the user equipment to instruct the user equipment to reestablish an uplink, which can effectively reduce the phenomenon of video playback being stuck that occurs in scenario 2.

Figure 8:
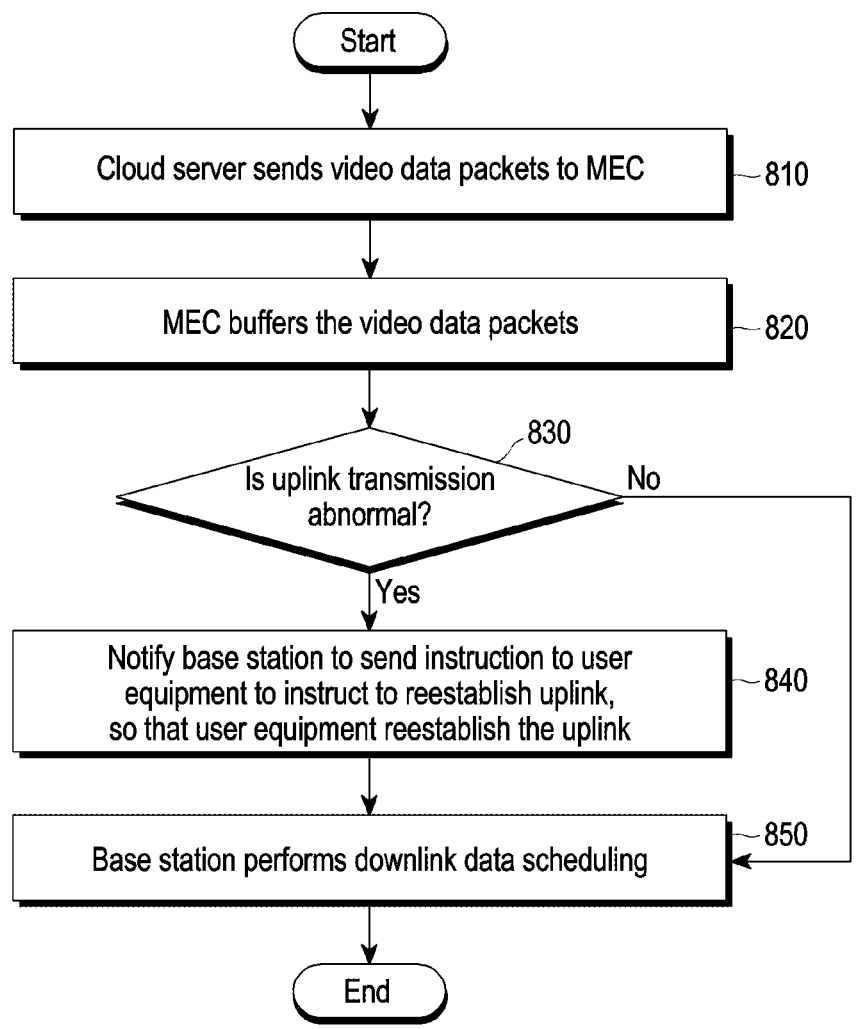
FIG. 8 is a flowchart illustrating a wireless communication process under a second scenario according to an example embodiment.

FIG. 8 is a flowchart illustrating a wireless communication process under a second scenario (scenario 2) according to an example embodiment.

Referring to FIG. 8, in operation 810, the cloud server sends video data packets to the MEC. In operation 820, the MEC buffers the video data packets. During the video data packet transmission process, the MEC may monitor the uplink in real time to obtain the second information about the uplink transmission status between the user equipment and the base station in the wireless network. For example, the second information may include whether the transmission of the uplink data packet is timely. In operation 830, it may be determined whether the uplink transmission is abnormal according to the second information. For example, the MEC may monitor whether the base station receives timely acknowledgement (ACK) feedback for the data sent by the base station from the user equipment to determine whether the transmission of the uplink data packet is timely. If the MEC detects that the base station does not receive the ACK data packet fed back by the user equipment in time after the data packet is scheduled downlink, or if the base station cannot detect the channel sounding reference signal (SRS) of the uplink, it may determine the uplink of the user equipment is abnormal (for example, the uplink may be interrupted or subject to strong interference). In this case, in operation 840, the MEC may notify the base station to send an instruction (e.g., an RRC reconfiguration instruction) to the user equipment to instruct to reestablish an uplink, so that the user equipment may reestablish the uplink in time, thereby ensuring that the downlink data scheduling of the base station may be carried out normally and the normal transmission link may be restored in time. Then, after the user equipment reestablishes the uplink, in operation 850, the base station performs downlink data scheduling. With the manner shown in FIG. 8, the problem in scenario 2 mentioned above may be effectively solved.

Referring back to FIG. 1, after the status information is acquired, in operation 120, an operation is performed according to the status information to adjust the video data transmission between the user equipment and the server. According to an embodiment, the status information may include the third information. In the case that the status information includes the third information, the operation 120 may include: if it is determined according to the third information that the resource scheduling of the base station is insufficient, processing video data received from the server to reduce the size of the video data to be transmitted to the base station, and transmitting the processed video data to the base station.

As mentioned above, in the process of video data transmission, scenario 3 may occur, that is, because a large number of user equipments use shared resources of the base station at the same time, the base station cannot dispatch sufficient resources to users watching the videos due to insufficient shared resources, which may also lead to insufficient download of video data packets and thus the phenomenon of playback being stuck occurs.

For this scenario, according to an example embodiment, the MEC may acquire the third information during data transmission, and if it is determined according to the third information that the resource scheduling of the base station is insufficient, the MEC may process the video data received from the server to reduce the size of the video data to be sent to the base station, and send the processed video data to the base station, thereby effectively reducing the phenomenon of video playback being stuck that occurs in scenario 3.

Figure 9:
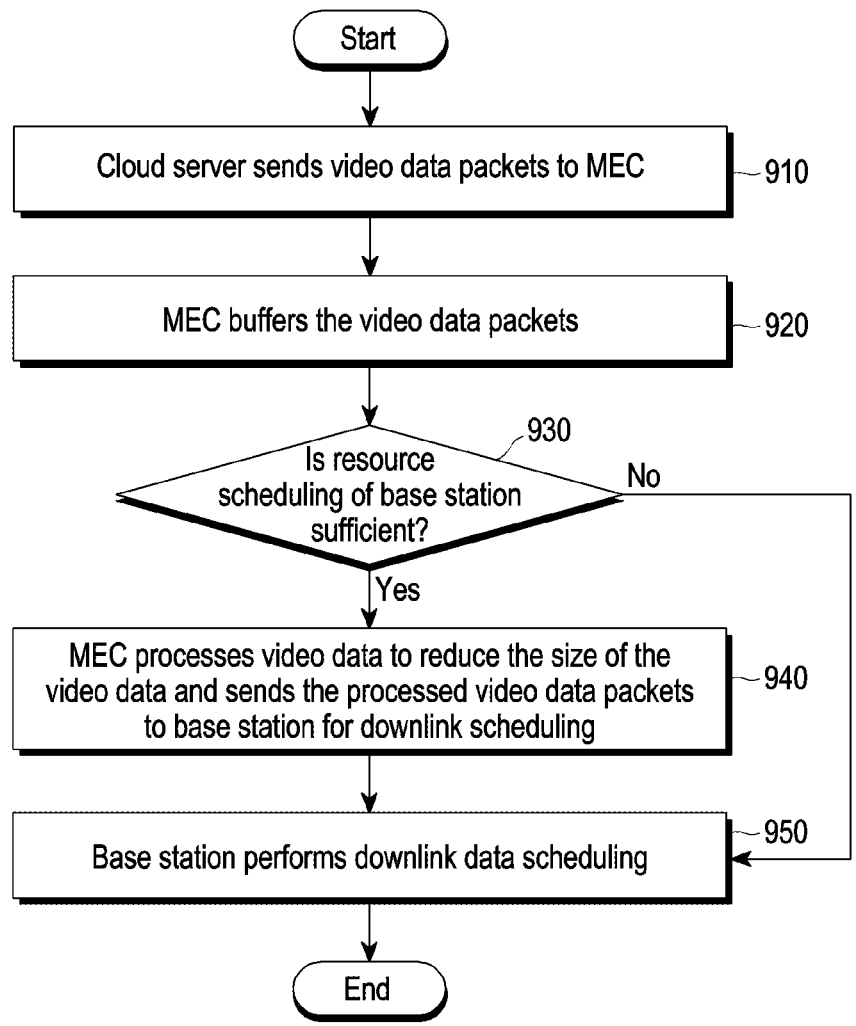
FIG. 9 is a flowchart illustrating a wireless communication process under a third scenario according to an example embodiment.

FIG. 9 is a flowchart illustrating a wireless communication process under a third scenario (scenario 3) according to an example embodiment.

Referring to FIG. 9, in operation 910, the cloud server sends video data packets to the MEC. In operation 920, the MEC buffers the video data packets. During the transmission of the video data packets, the MEC may monitor the base station in real time to obtain the third information about the resource scheduling status of the base station. In operation 930, the MEC may determine whether the resource scheduling of the base station is sufficient according to the third information. If the MEC monitors in real-time and finds that the base station has insufficient scheduling resources due to a large number of simultaneous visits, resulting in a decrease in the amount of downlink scheduling data of the base station, and the stream cannot reach the rate of smooth playback, then in operation 940, the MEC may process the video data to reduce the size of the video data, for example, the MEC further compresses the downlink video data packets to further reduce the capacity of the video data packets with the same duration of playback, and then the MEC sends the processed video data packets to the base station for downlink scheduling, to ensure that the user equipment may play videos smoothly. According to an embodiment, the processing performed by the MEC includes, but is not limited to, lowering the resolution, lowering the frame rate, re-encoding the video, reducing the size of the data packet, and the like. Subsequently, in operation 950, the base station performs downlink data scheduling. Through the manner shown in FIG. 9, the problem in scenario 3 mentioned above can be effectively solved.

Referring back to FIG. 1, after the status information is acquired, in operation 120, an operation is performed according to the status information to adjust the video data transmission between the user equipment and the server. According to an embodiment, the status information may include the fourth information about data transmission between a user plane function entity in the wireless network and the server. In the case that the status information includes the fourth information, the operation 120 may include: if it is determined according to the fourth information that the amount of data downloaded by the user plane function entity from the server is less than a threshold, adding or reestablishing a data transmission link between the user plane function entity and the server.

As mentioned above, in the process of video data transmission, scenario 4 may occur, that is, the video server in the cloud cannot process a video data request of the user equipment in time because of busyness. Therefore, the base station cannot obtain enough video data packets for downlink scheduling, which may also cause the video playback being stuck on the user equipment due to insufficient downloaded video data packets.

For this scenario, according to an example embodiment, the fourth information may acquired during data transmission, if it is determined according to the fourth information that the amount of data downloaded by the user plane function entity from the server is less than the threshold, the MEC may add or reestablish a data transmission link between the user plane function entity and the server, thereby effectively reducing the phenomenon of video playback being stuck that occurs in scenario 4.

Figure 10:
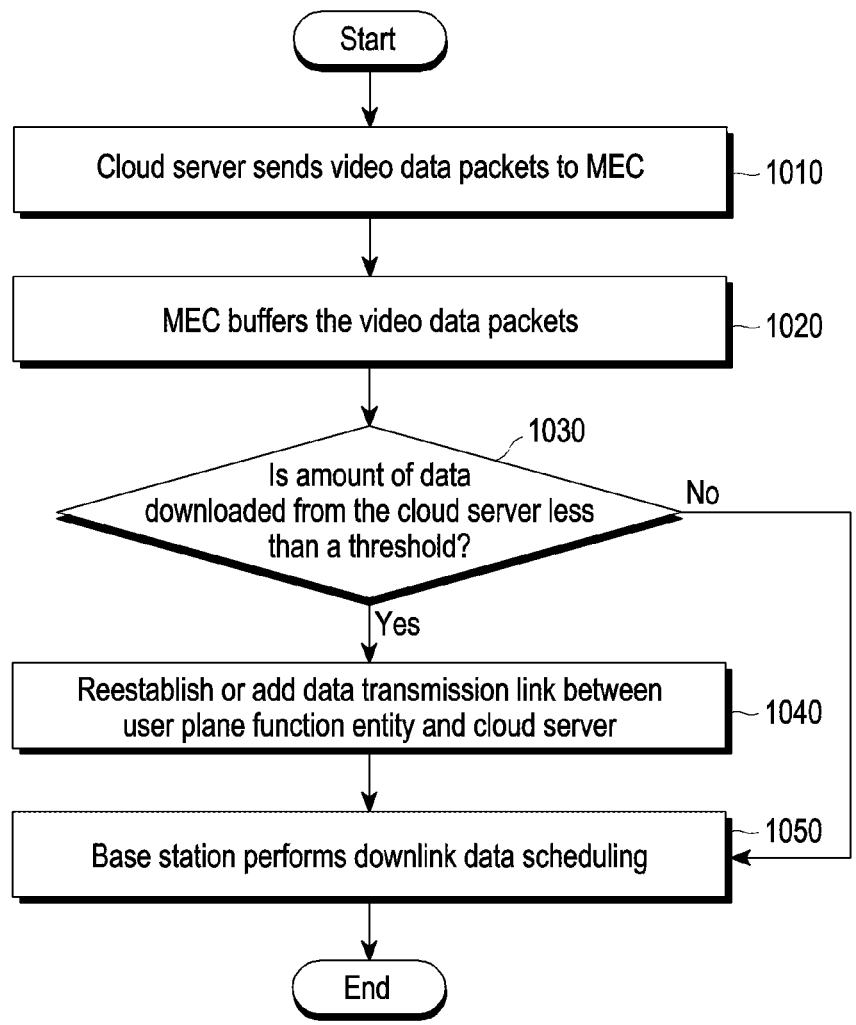
FIG. 10 is a flowchart illustrating a wireless communication process under a fourth scenario according to an example embodiment.

FIG. 10 is a flowchart illustrating a wireless communication process under a fourth scenario (scenario 4) according to an example embodiment.

Referring to FIG. 10, in operation 1010, the cloud server sends video data packets to the MEC. In operation 1020, the MEC buffers the video data packets. During the transmission of the video data packets, the MEC may monitor the data transmission link between the user function entity and the cloud server to obtain the fourth information. For example, the fourth information may include a situation in which the user plane function entity downloads data packets from the cloud server, for example, information on the amount of video data packets downloaded by the user plane function entity from the cloud server, or information on the download speed of video data packets, etc. For example, in operation 1030, the MEC may determine, according to the fourth information, whether the amount of data downloaded by the user plane function entity from the cloud server is less than a threshold. If it is detected that the number of video data packets downloaded from the cloud server is insufficient, resulting in that the base station cannot fully schedule downlink due to too little data volume, in operation 1040, the MEC may reestablish or add a data transmission link (such as a TCP/IP transmission link) between the user plane function entity and the cloud server, to ensure that the user plane function entity may download enough video data packets and forward them to the base station for sufficient downlink data scheduling, thereby ensuring smooth video playback by the user equipment. Subsequently, in operation 1050, the base station performs downlink data scheduling. Through the manner shown in FIG. 10, the problem in scenario 4 mentioned above can be effectively solved.

Referring back to FIG. 1, after the status information is acquired, in operation 120, an operation is performed according to the status information to adjust the video data transmission between the user equipment and the server. According to an embodiment, the status information may include the fifth information about a status of a core network control plane in the wireless network. As an example, the MEC may register events of interest in the core network, such as tracking area update (TAU) registration, cell handover, transmission policy change, PUD session modification, etc., by interacting with the core network control plane, such that the MEC may know events in time when the events occur and then obtain the fifth information according to these events. In the case that the status information includes the fifth information, the operation 120 may include: if it is determined according to the fifth information that the transmission link between the user equipment and the base station is changed, performing the operation to reduce influence of the change of the transmission link on downlink data transmission. For example, the change of the transmission link may include the user equipment performs handover of a cell and there is a link speed limit to a target cell that is handed over to, however, the change of the transmission link is not limited to this, for example, the change of the transmission link may further include the change of the data transmission policy of the transmission link, etc.

As mentioned above, in the process of video data transmission, scenario 5 may occur, that is, after the user equipment performs handover of a cell, the downlink scheduling delay may be caused by the link handover, and the change of the bearer link policy of the target cell may also limit the download data speed of the user equipment, resulting in insufficient video data packets downloaded by the mobile phone and playback being stuck.

For this scenario, according to an example embodiment, the MEC may acquire the fifth information during data transmission, if it is determined according to the fifth information that the transmission link is changed, the MEC may process the video data received from the server to reduce the size of the video data to be sent to the base station, and send the processed video data to the base station, thereby effectively reducing the phenomenon of video playback being stuck that occurs in scenario 5.

Each embodiment herein may be used in combination with any other embodiment(s) described herein.

Figure 11:
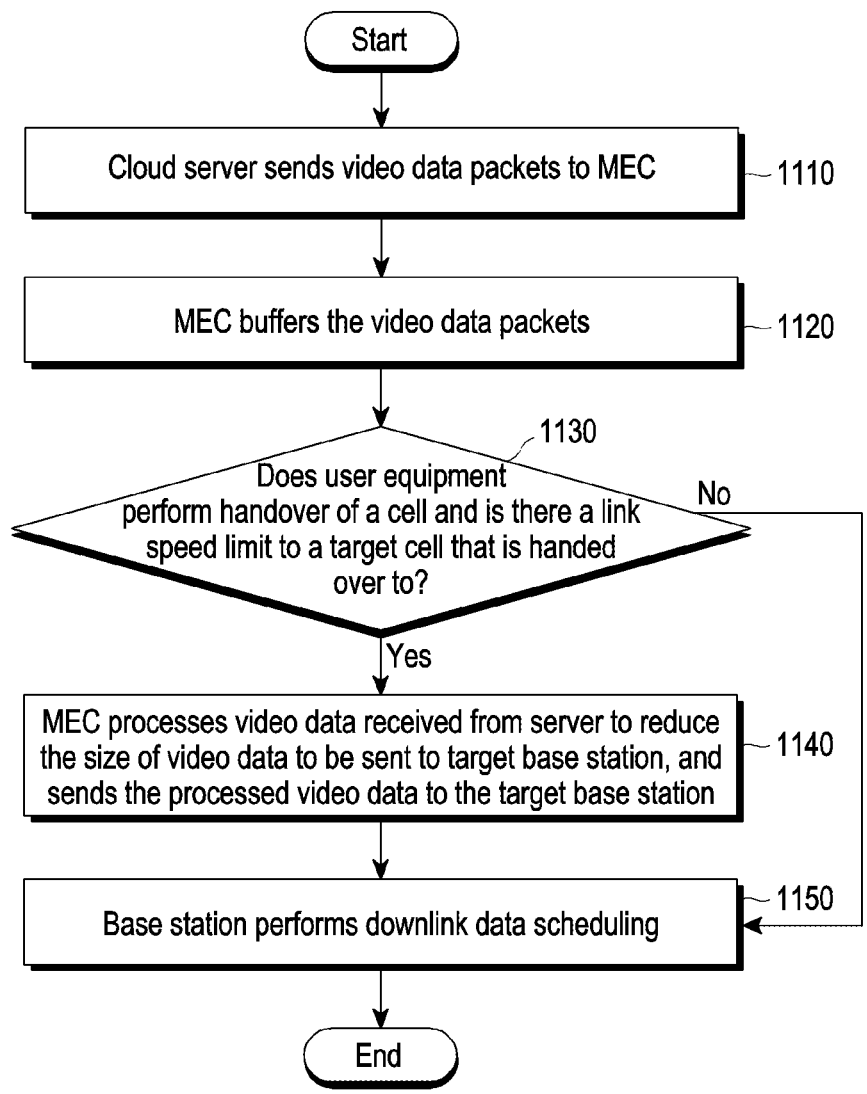
FIG. 11 is a flowchart illustrating a wireless communication process under a fifth scenario according to an example embodiment.

FIG. 11 is a flowchart illustrating a wireless communication process under a fifth scenario (scenario 5) according to an example embodiment.

Referring to FIG. 11, in operation 1110, the cloud server sends video data packets to the MEC. In operation 1120, the MEC buffers the video data packets. During the transmission of video data packets, the MEC may monitor whether the transmission link is changed through pre-registered events of interest in the core network. In operation 1130, the MEC may determine, according to the fifth information, whether the user equipment performs handover of a cell and whether there is a link speed limit to a target cell that is handed over to. If it is determined that the user equipment has performed the handover of the cell and there is the link speed limit to the target cell that is handed over to, then in operation 1140, the MEC processes the video data received from the server to reduce the size of the video data to be sent to the target base station, and sends the processed video data to the target base station. The downlink data packets are forwarded to the target base station for downlink scheduling in a timely manner through the MEC, which reduces the downlink scheduling delay caused by link switching, and adjusts the data download amount according to the speed limit of the target cell to ensure that the user equipment may play the videos smoothly. For example, the MEC may process the video data to reduce the size of the video data by adjusting the video resolution, frame rate, encoding method, etc., and then forward the processed video data to the base station for scheduling. It should be noted that the manner in which the video data is processed to reduce the size of the video data in the present disclosure is not limited to the above examples. Then, in operation 1150, the base station performs downlink data scheduling. Through the manner shown in FIG. 11, the problem in scenario 5 mentioned above can be effectively solved. Each server herein comprises circuitry, and each UE herein comprises circuitry.

Although in the example of FIG. 11, the change of the transmission link is that the user equipment performs handover of the cell and the link speed of the target cell is limited as an example, however, the change of the transmission link may also be a transmission link failure, etc. Therefore, correspondingly, the MEC may also reduce the impact of changes in the transmission link on downlink data transmission by instructing other net elements in the core network to maintain, manage, and recover the transmission link.

In the above, the wireless communication method performed by the network function entity according to an example embodiment has been described with reference to FIGS. 1 to 11. The status information related to the data transmission link is acquired during the process of video data transmission between the user equipment and the server via the wireless network, the operation is performed to adjust the video data transmission between the user equipment and the server according to the status information, so that the video playback can be prevented or reduced from being stuck and/or interrupted, and the user experience can be improved.

Hereinafter, the network function entity according to an example embodiment will be described with reference to FIG. 12 and FIG. 13.

Figure 12:
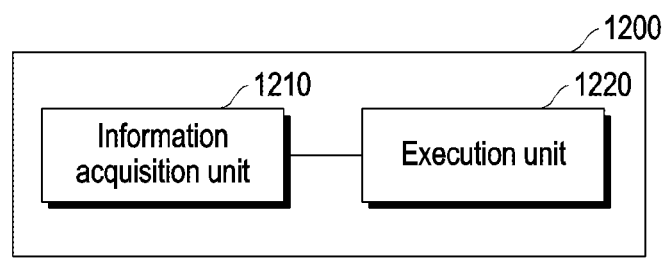
FIG. 12 is a block diagram illustrating a network function entity according to an example embodiment.

FIG. 12 is a block diagram illustrating a network function entity according to an exemplary embodiment. As shown in FIG. 12, the network function entity 1200 includes an information acquisition unit 1210 and an execution unit 1220. Specifically, the information acquisition unit 1210 is configured to acquire status information related to a data transmission link during a process of video data transmission between a user equipment and a server via the wireless network. The execution unit 1220 is configured to perform an operation to adjust the video data transmission between the user equipment and the server according to the status information.

Since the information acquisition unit 1210 and the execution unit 1220 respectively perform operations 110 and 120 in FIG. 1, for any relevant details involved in the operations performed by the above-mentioned units, the corresponding description in FIGS. 1 to 11 may be referred, which may not be repeated here. In addition, it should be noted that although the network function entity 1200 is described above as being divided into units for performing corresponding processing respectively, it is clear to those skilled in the art that the processing performed by the above units can also be performed in the network function entity 1200 without any specific unit division or clear demarcation between units. In addition, the network function entity 1200 may also include other units, for example, a storage unit and the like. For example, the storage unit may store acquired status information, video data received from a server, and the like.

Figure 13:
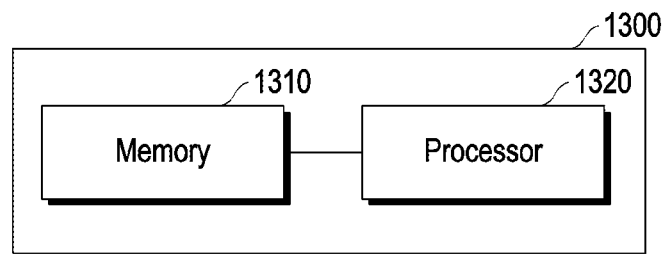
FIG. 13 is another block diagram illustrating a network function entity according to an example embodiment.

FIG. 13 is another block diagram illustrating a network function entity according to an exemplary embodiment.

Referring to FIG. 13, the network function entity 1300 includes at least one memory 1310 and at least one processor 1320. The at least one memory stores computer executable instructions, the computer executable instructions, when executed by the at least one processor 1320, cause the at least one processor 1320 to perform a wireless communication method according to an example embodiment. Each processor herein comprises processing circuitry.

According to an example embodiment, a computer readable storage medium storing a computer program is also provided. The computer program, when executed by at least one processor, causes the at least one processor to perform a wireless communication method according to an example embodiment. Examples of computer-readable storage media herein include: read only memory (ROM), random access programmable read only memory (RAPROM), electrically erasable programmable read only memory (EEPROM), random access memory (RAM), dynamic random access memory (DRAM), static random access memory (SRAM), flash memory, non-volatile memory, CD-ROM, CD-R, CD+R, CD-RW, CD+RW, DVD-ROM, DVD-R, DVD+R, DVD-RW, DVD+RW, DVD-RAM, BD-ROM, BD-R, BD-R LTH, BD-RE, Blue-ray or optical disk storage, hard disk drive (HDD), solid state drive (SSD), card storage (such as multimedia cards, secure digital (SD) cards or extremely fast digital (XD) cards), magnetic tapes, floppy disks, magneto-optical data storage devices, optical data storage devices, hard disks, solid state disks, and any other devices that are configured to store computer programs and any associated data, data files and data structures in a non-transitory manner and provide the computer programs and any associated data, data files and data structures to a processor or computer so that the processor or computer can execute the computer programs. The instructions or computer programs in the computer-readable storage medium described above may be executed in an environment deployed in a computer device. In addition, in one example, the computer programs and any associated data, data files, and data structures are distributed on a networked computer system, so that the computer programs and any associated data, data files, and data structures are stored, accessed and executed through one or more processors or computers in a distributed manner.

Other embodiments may readily be conceived by those skilled in the art upon consideration of the specification. This application is intended to cover any variations, uses, or adaptations that follow the general principles herein. The specification and examples are to be regarded as exemplary only, with the true scope and spirit of the disclosure being defined by the claims.

What is claimed is:

1. A wireless communication method performed by a multi-access edge computing (MEC) net element in a wireless network, the method comprising:
   receiving, by the MEC net element, video data packets from a server and buffering the video data packets during a process of video data transmission between a user equipment and the server via the wireless network;
   acquiring, by the MEC net element, status information related to the data transmission link during the process of video data transmission between the user equipment and the server via the wireless network;
   adjusting, by the MEC net element, the video data transmission between the user equipment and the server based on the status information,
   wherein the status information further comprises information about a status of a core network control plane in the wireless network,
   wherein the adjusting the video data transmission between the user equipment and the server based on the status information comprises performing operation to reduce influence of a change of the transmission link on downlink data transmission based on a determination based on the information about the status of the core network control plane that the transmission link between the user equipment and the base station is changed,
   wherein the status information comprises information that the user equipment performs handover of a target cell and there is a link speed limit to the target cell that is handed over to,
   wherein the adjusting the video data transmission between the user equipment and the server based on the status information comprises:
   processing video data received from the server to reduce a size of the video data to be transmitted to the base station, and
   transmitting the processed video data to the base station.

2. The wireless communication method of claim 1, wherein the status information further comprises at least one of:
   first information about a channel quality of a transmission link between the user equipment and a base station in the wireless network;
   second information about an uplink transmission status of the user equipment to the base station;
   third information about a resource scheduling status of the base station; and
   fourth information about data transmission between a user plane function entity in the wireless network and the server.

3. The wireless communication method of claim 2, wherein the status information comprises the first information, and the performing of the operation to adjust the video data transmission between the user equipment and the server based on the status information comprises:
   processing video data received from the server to reduce a size of the video data to be transmitted to the base station based on a determination based on the first information that the channel quality is lower than a threshold, and transmitting the processed video data to the base station.

4. The wireless communication method of claim 2, wherein the status information comprises the second information, and the performing of the operation to adjust the video data transmission between the user equipment and the server based on the status information comprises:
   notifying the base station to transmit a signaling to the user equipment that instructs the user equipment to reestablish an uplink based on a determination based on the second information that the uplink transmission from the user equipment to the base station is abnormal.

5. The wireless communication method of claim 2, wherein the status information comprises the third information, and the performing of the operation to adjust the video data transmission between the user equipment and the server based on the status information comprises:
   processing video data received from the server to reduce a size of the video data to be transmitted to the base station based on a determination based on the third information that the resource scheduling of the base station is insufficient, and transmitting the processed video data to the base station.

6. The wireless communication method of claim 2, wherein the status information comprises the fourth information, and the performing of the operation to adjust the video data transmission between the user equipment and the server based on the status information comprises:
   adding or reestablishing a data transmission link between the user plane function entity and the server based on a determination based on the fourth information that the amount of data downloaded by the user plane function entity from the server is less than a threshold.

7. A multi-access edge computing (MEC) net element comprising:
   a memory;
   at least one processor for executing instructions in the memory, wherein the at least one processor is configured to:

receive video data packets from a server and buffer the video data packet during a process of video data transmission between a user equipment and the server via the wireless network;

acquire status information related to a data transmission link during a process of video data transmission between a user equipment and a server via the wireless network; and adjust the video data transmission between the user equipment and the server based on the status information, wherein the status information further comprises information about a status of a core network control plane in the wireless network, wherein the at least one processor is configured to adjust the video data transmission between the user equipment and the server based on the status information comprises performing operation to reduce influence of a change of the transmission link on downlink data transmission based on a determination based on the information about the status of the core network control plane that the transmission link between the user equipment and the base station is changed, wherein the status information comprises information that the user equipment performs handover of a target cell and there is a link speed limit to the target cell that is handed over to, wherein the at least one processor is configured to adjust the video data transmission between the user equipment and the server based on the status information at least by:

process video data received from the server to reduce a size of the video data to be transmitted to the base station, and transmit the processed video data to the base station.

8. The MEC net element of claim 7, wherein the status information comprises at least one of:

first information about a channel quality of a transmission link between the user equipment and a base station in the wireless network;

second information about an uplink transmission status of the user equipment to the base station;

third information about a resource scheduling status of the base station; and fourth information about data transmission between a user plane function entity in the wireless network and the server.

9. The MEC net element of claim 8, wherein the status information comprises the first information, and the at least one processor is configured to adjust the video data transmission between the user equipment and the server based on the status information at least by:

processing video data received from the server to reduce a size of the video data to be transmitted to the base station when it is determined based on the first information that the channel quality is lower than a threshold, and wherein the at least one processor is configured to control for transmitting the processed video data to the base station.

10. The MEC net element of claim 8, wherein the status information comprises the second information, and the at least one processor is configured to adjust the video data transmission between the user equipment and the server based on the status information at least by:

notifying the base station to transmit a signaling to the user equipment that instructs the user equipment to reestablish an uplink when it is determined based on the second information that the uplink transmission from the user equipment to the base station is abnormal.

11. The MEC net element of claim 8, wherein the status information comprises the third information, and the at least one processor is configured to adjust the video data transmission between the user equipment and the server based on the status information at least by:

processing video data received from the server to reduce a size of the video data to be transmitted to the base station when it is determined based on the third information that the resource scheduling of the base station is insufficient, and wherein the at least one processor is configured to control for transmitting the processed video data to the base station.

12. The MEC net element of claim 8, wherein the status information comprises the fourth information, and the at least one processor is configured to adjust the video data transmission between the user equipment and the server based on the status information at least by:

adding or reestablishing a data transmission link between the user plane function entity and the server when it is determined based on the fourth information that the amount of data downloaded by the user plane function entity from the server is less than a threshold.

* * * * *